(12) United States Patent
Xiong et al.

(10) Patent No.: US 10,326,377 B1
(45) Date of Patent: Jun. 18, 2019

(54) CIRCUIT AND METHOD FOR INDIRECT PRIMARY-SIDE LOAD CURRENT SENSING IN AN ISOLATED POWER SUPPLY

(71) Applicant: Universal Lighting Technologies, Inc., Madison, AL (US)

(72) Inventors: Wei Xiong, Madison, AL (US); Travis L. Berry, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/048,867

(22) Filed: Jul. 30, 2018

Related U.S. Application Data

(60) Provisional application No. 62/553,196, filed on Sep. 1, 2017.

(51) Int. Cl.
*H02M 3/335* (2006.01)
*H02M 1/088* (2006.01)
*H05B 33/08* (2006.01)
*H02M 1/00* (2006.01)

(52) U.S. Cl.
CPC ....... *H02M 3/33569* (2013.01); *H02M 1/088* (2013.01); *H05B 33/0815* (2013.01); *H05B 33/0851* (2013.01); *H02M 2001/0009* (2013.01)

(58) Field of Classification Search
CPC . H02M 2001/0009; H02M 2001/0058; H02M 3/335; H02M 3/33507; H02M 3/33523; H02M 3/33569; H02M 2007/4815; H02M 7/523; H02M 7/528
See application file for complete search history.

(56) References Cited

U.S. PATENT DOCUMENTS

| 7,772,782 | B2* | 8/2010 | Chu .................. | H05B 33/0815 315/219 |
| 9,787,195 | B1 | 10/2017 | Xiong et al. | |
| 2007/0285953 | A1* | 12/2007 | Koo .................. | H02M 3/33507 363/21.02 |
| 2013/0121037 | A1* | 5/2013 | Peng .................. | H02M 3/3376 363/21.03 |

OTHER PUBLICATIONS

NCP1392B, NCP1392D, "High-Voltage Half-Bridge Driver with Inbuilt Oscillator," ON Semiconductor, Mar. 2016, pp. 1-21.

* cited by examiner

*Primary Examiner* — Gary L Laxton
(74) *Attorney, Agent, or Firm* — Patterson Intellectual Property Law, P.C.; Gary L. Montle; Jerry Turner Sewell

(57) ABSTRACT

A DC-to-AC inverter provides an AC voltage to the primary winding of an output isolation transformer having at least one secondary winding and having an auxiliary winding. The current supplied to a secondary load is reflected back into the primary winding as a reflected secondary current. A first feedback signal has a reflected secondary current component and has a primary magnetizing current component. An auxiliary winding voltage is applied to an inductor to generate an auxiliary current proportional to the primary winding magnetizing current. A second feedback signal is responsive to the auxiliary current. The second feedback signal is combined with the first feedback signal to produce a total feedback signal responsive only to the reflected secondary current. The DC-to-AC inverter responds to the total feedback signal and a reference signal to adjust the AC voltage to maintain the total feedback signal at a magnitude corresponding to the reference signal.

17 Claims, 4 Drawing Sheets

CIRCUIT AND METHOD FOR INDIRECT PRIMARY-SIDE LOAD CURRENT SENSING IN AN ISOLATED POWER SUPPLY

CROSS-REFERENCE TO RELATED APPLICATION

This application claims the benefit under 35 U.S.C. § 119(e) of U.S. Provisional Application No. 62/553,196, filed Sep. 1, 2017, entitled "Circuit and Method for Indirect Primary-Side Load Current Sensing in an Isolated Power Supply," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to power supplies that provide a DC current to a load, such as, for example, light-emitting diodes. More particularly, the present disclosure relates to an apparatus and a method for sensing current through the load to provide feedback to the power supply to enable the power supply to maintain a substantially constant current through the load.

BACKGROUND

FIG. 1 illustrates a typical half-bridge resonant type DC-DC converter 100, which provides a solution for a constant current output power supply. The illustrated converter offers a wide range of output load currents and is stable over the operating range. The converter includes a primary circuit side 102 and a second circuit side 104, which are electrically isolated as described below. The converter includes a first switch 112 and a second switch 114 in a half-bridge switching circuit 110. The switches may be, for example, metal oxide semiconductor field effect transistors (MOSFETs) or bipolar junction transistors (BJTs). In the illustrated embodiment, the two switches are n-channel MOSFETs. The half-bridge switching circuit is connected between a DC input bus 120 (also labeled as $V_{RAIL}$) and a primary circuit ground reference 122. The drain of the first switch is connected to the DC input bus. The source of the first switch is connected to the drain of the second switch at a common switched node 124 of the half-bridge switching circuit. The source of the second switch is connected to the primary circuit ground reference.

In the illustrated embodiment, the voltage on the DC input bus 120 is provided by a first DC voltage source 130. In the illustrated embodiment, the first DC voltage source is illustrated as a battery; however, it should be understood that the voltage on the DC input bus may be provided by other sources, such as, for example, a power factor correction (PFC) stage, the DC output of a bridge rectifier, or the like, which are supplied from an AC source (not shown). The battery is representative of a variety of voltage sources that provide a substantially constant voltage on the DC input bus.

Each of the first switch 112 and the second switch 114 has a respective control input terminal. In the illustrated embodiment incorporating MOSFETs, the control input terminals are the gates of the two transistors. The control input terminals are driven by a self-oscillating half-bridge gate drive integrated circuit (drive IC) 140, such as, for example, an NCP1392B high-voltage half-bridge driver with inbuilt oscillator, which is commercially available from ON Semiconductor Company of Phoenix, Ariz. The drive IC is powered by a second DC voltage source 142 via a $V_{CC}$ input pin 144. In FIG. 1, the second DC voltage source is illustrated as a battery; however, it should be understood that the second DC voltage source may also be derived from an AC source.

The drive IC 140 is responsive to a timing resistance connected to a timing input terminal (RT) 150 to alternately apply an upper drive voltage on an upper drive terminal (MU) 152 and apply a lower drive voltage to a lower drive terminal (ML) 154. The upper output drive voltage is applied to the control input terminal of the first switch 112. The lower output drive voltage is applied to the control input terminal of the second switch 114. When the resistance applied to the timing input terminal increases, the current flowing out of the timing input terminal decreases, which causes the frequency of the drive voltages applied to the two switches to decrease. When the resistance applied to the timing input terminal decreases, the current flowing out of the timing input terminal increases, which causes the frequency of the drive voltages to increase. The drive IC further includes a brownout (BO) input terminal 160, which is connected to a common node 164 of a voltage divider circuit 162. The voltage divider circuit comprises a first voltage divider resistor 166 connected between the DC input bus 120 and the common node. The voltage divider circuit further comprises a second voltage divider resistor 168 connected between the common node and the primary circuit ground reference 122. The drive IC is responsive to a low voltage on the brownout input terminal to cease switching if the voltage on the DC input bus drops below a selected voltage.

The common switched node 124 of the half-bridge switching circuit 110 is connected to a half-bridge connection terminal (HB) 170 of the drive IC 140. The common switched node is also connected to a first terminal of a resonant inductor 182 in a resonant circuit 180. A second terminal of the resonant inductor is connected to a first terminal of a resonant capacitor 184 at an output node 186 in the resonant circuit. A second terminal of the resonant capacitor is connected to the primary circuit ground reference 122. The resonant inductor and the resonant capacitor are the main resonant components of the resonant circuit, which is driven by the alternatingly connecting the common switched node to the DC bus 120 via the first switch 112 and to the primary circuit ground reference via the second switch 114.

The output node 186 of the resonant circuit 180 is connected to a first terminal of a DC blocking capacitor 190. A second terminal of the DC blocking capacitor is connected to a first terminal 204 of a primary winding 202 of an output isolation transformer 200. A second terminal 206 of the primary winding of the output isolation transformer is connected to the primary circuit ground reference 122. The foregoing components operate as a DC-to-AC inverter produce an AC voltage across the primary winding of the output isolation transformer.

The output isolation transformer 200 includes a first secondary winding 210 and a second secondary winding 212. The two secondary windings are electrically isolated from the primary winding 202. As illustrated, the primary winding is on the primary circuit side 102, and the secondary windings are on the secondary circuit side 104. The two secondary windings have respective first terminals, which are connected at a center tap 218. Respective second terminals 214, 216 of the first and second secondary windings are connected to input terminals of a half-bridge rectifier 220. The half-bridge rectifier comprises a first rectifier diode 222 and a second rectifier diode 224. The second terminal of the first secondary winding is connected to the anode of the first rectifier diode. The second terminal of the second secondary winding is connected to the anode of the second rectifier diode. The cathodes of the two rectifier diodes are connected together at an output node 226 of the half-bridge rectifier. The center tap of the first and second secondary windings is connected to a secondary circuit ground reference 228. In other embodiments having a single, non-center-tapped secondary winding, the half-bridge rectifier with the two rectifier diodes may be replaced with a full-bridge rectifier with four rectifier diodes.

The output node 226 of the half-bridge rectifier 220 is connected to a first terminal of an output filter capacitor 230. A second terminal of the output filter capacitor is connected to the secondary circuit ground reference 228. A load voltage ($V_{LOAD}$) is developed across the output filter capacitor at the output node of the half-bridge rectifier. The output node of the half-bridge rectifier is also connected to a first terminal of a load 240, which may comprise, for example, one or more light-emitting didoes (LEDs) that emit light when sufficient current passes through the LEDs. A second terminal of the load is connected to a current sensing terminal 242 and to the first terminal of a current sensing resistor 244. A second terminal of the current sensing resistor is connected to the secondary circuit ground reference. When current flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm such that the effect of the resistance of the current sensing resistor on the load current is insignificant.

When the drive IC 140 operates to apply alternating drive voltages to the first switch 112 and the second switch 114, an AC voltage develops across the resonant capacitor 184. The voltage across the resonant capacitor may include a DC component; however, the DC blocking capacitor 190 transfers only the AC component of the energy stored in the resonant capacitor to the primary winding 202 of the output isolation transformer 200. The transferred energy is magnetically coupled from the primary winding to the electrically isolated first and second secondary windings 210, 212. The first and second rectifier diodes 222, 224 in the half-bridge rectifier 220 rectify the AC energy from the secondary windings into DC energy, which is provided on the output node 226. The DC energy is stored in the output filter capacitor 230 at a voltage determined by the amount of stored energy. Current from the output filter capacitor is provided to the load 240 at a magnitude determined by the voltage on the half-bridge rectifier output node and the resistance of the load.

Because the intensity of the light emitted by the LEDs in the load 240 is dependent on the magnitude of the current flowing through the LEDs, the current is controlled closely. The current sensing resistor 244 senses the current going through the load and develops a voltage $V_{ISENSE}$ on the current sensing node 242 proportional to the load current. The voltage representing the sensed current is fed back to a proportional integral (PI) current control loop to provide current regulation. In FIG. 1, the PI current control loop comprises an operational amplifier (OPAMP) 260 having an inverting (−) input terminal, having a non-inverting (+) input terminal, and having an output (OUT) on an output terminal 264. The current sensing node is connected to the inverting input of the operational amplifier via a series resistor 262. A feedback resistor 266 and a feedback capacitor 268 are connected in series between the output terminal of the operational amplifier and the inverting input. A reference voltage ($V_{IREF}$) having a magnitude corresponding to a reference current ($I_{REF}$) is connected to the non-inverting input of the operational amplifier. The magnitude of the reference current and thus the magnitude of the reference voltage are selected to produce a desired load current through the load. The reference current may be a fixed reference current to provide a constant load current, or the reference current may be a variable reference current to allow the load current to be varied to thereby change the intensity of the light emitted by the LEDs in the load. The operational amplifier is responsive to the relative magnitudes of the reference voltage $V_{IREF}$ and the sensed voltage $V_{ISENSE}$ to provide feedback to the drive IC 140 as described below.

The output 264 of the operational amplifier 260 is connected to the input of a photocoupler 270. The photocoupler (also referred to as an opto-isolator or an optocoupler) has an internal light generation section (e.g., an LED) coupled to the input of the photocoupler. The light generation section is responsive to a voltage applied to the input to generate light. The applied voltage is referenced to the secondary circuit ground reference 228 to which the light generation section is connected. The generated light is propagated internally to the base of a phototransistor in an output section within the same component. The phototransistor is responsive to the generated light to vary the conductivity and thereby to effectively vary the impedance of the phototransistor. The phototransistor has a collector that is connected via a collector resistor 280 to the second DC voltage source 142. The phototransistor has an emitter that is connected to the primary circuit ground reference 122 by an emitter filter capacitor 282. The emitter of the phototransistor is also connected via an emitter resistor 284 to a timing current control node 290. A first timing resistor 292 is connected from the timing input terminal (RT) 150 of the drive IC 140 to the timing current control node. A second timing resistor 294 is connected from the timing current control node to the primary circuit ground reference. As illustrated the photocoupler electrically isolates the secondary circuit voltages and the secondary circuit ground reference in the secondary circuit side 104 from the components in the primary circuit side 102.

When the voltage applied to the input of the photocoupler 270 increases, the effective impedance of the phototransistor in the output section of the photocoupler decreases to raise the voltage on the timing current control node 290. This causes the voltage difference across the first timing resistor 292 to decrease, which decreases the current flowing out of the timing input terminal 150. The decreased current decreases the switching frequency of the drive IC 140.

When the voltage applied to the input of the photocoupler 270 decreases, the effective impedance of the phototransistor in the output section of the photocoupler increases to lower the voltage on the timing current control node 290. This causes the voltage difference across the first timing resistor 292 to increase, which increases the current flowing out of the timing input terminal. The increased current increases the switching frequency of the drive IC 140.

The illustrated drive IC 140 has a fixed deadtime between turning off one of the switched outputs and turning on the other of the switched outputs. The fixed deadtime causes the duty cycle of the on-time of each of the first and second switches 112, 114 to decrease with increased frequency and to increase with decreased frequency. A decrease in duty cycle causes the energy transferred to the load to decrease. An increase in duty cycle causes the energy transferred to the load to increase. Thus, the load current decreases with increased switching frequency, and the load current increases with decreased switching frequency.

From the foregoing, it can be seen that when the current through the current sensing resistor 244 generates a voltage $V_{ISENSE}$ that is less than the voltage $V_{IREF}$ corresponding to the reference current $I_{REF}$, the output voltage of the operational amplifier 260 increases. The increased output voltage produced by the operational amplifier causes the photocoupler 270 to increase the light generated between the input section and the output section, which causes the photoresistor in the output section to increase conductivity and thus decrease the effective impedance. This causes the voltage on the timing current control node 290 to increase, which decreases the current flowing out of the timing input terminal 150. The decreased current decreases the switching frequency of the drive IC 140, which increases the duty cycle of each switching voltage applied to the respective control input terminals of the first switch 112 and the second switch 114. The increased duty cycle has the effect of increasing the energy transferred to the output filter capacitor 230, which increases the voltage on the output node 226, which increases the current flowing through the load.

When the current flowing through the load is greater than the reference current, the opposite transitions occur. The voltage on the output of the operational amplifier 260 decreases. The effective impedance of the output section of the photocoupler 270 increases to cause the voltage on the timing control node 290 to decrease. The current flowing out of the timing input terminal 150 increases. The switching frequency of the drive IC 140 increases, which decreases the duty cycles of the two switch control voltages. The energy transferred to the output filter capacitor 230 decreases, which decreases the voltage on the output node 226, which decreases the current flowing through the load 240.

As shown above, the output isolation transformer 200 and the photocoupler 270 between the primary side circuit 102 and the secondary side circuit 104 effectively isolate the voltages and the ground references on the two circuits. However, many components are required to realize output current control for an isolated power supply. The additional components required to perform secondary side sensing and to feed back the sensed values to the primary side controllers increase the parts costs and also complicate the layout of a printed circuit board (PCB) onto which the components are mounted. Accordingly, a system that accurately senses the load current on the primary side would simplify the circuit design and PCB layout for an isolated power supply.

BRIEF SUMMARY

Accordingly, a need exists for an apparatus and a method for sensing secondary load current from the primary side of an output transformer such that the sensing apparatus in the primary circuitry is electrically isolated from the secondary circuitry.

One aspect of the embodiments disclosed herein is a DC-to-DC converter. The converter includes a DC-to-AC inverter that provides an AC voltage to the primary winding of an output isolation transformer having at least one secondary winding and having an auxiliary winding. A rectifier generates a DC load voltage that provides a current to a secondary load. The current supplied to the secondary load is reflected back into the primary winding as a reflected secondary current. A first feedback signal has a reflected secondary current component and has a primary magnetizing current component. The auxiliary winding voltage is applied to an inductor to generate an auxiliary current proportional to the primary winding magnetizing current. A second feedback signal is responsive to the auxiliary current. The second feedback signal is combined with the first feedback signal to produce a total feedback signal responsive only to the reflected secondary current. The DC-to-AC inverter responds to the total feedback signal and a reference signal to adjust the AC voltage to maintain the total feedback signal at a magnitude corresponding to the reference signal.

Another aspect of the embodiments disclosed herein is a system for controlling the current through a DC load. The system comprises a DC-to-AC inverter configured to generate a primary AC voltage to a primary winding of an isolation transformer. The primary AC voltage has a nominal frequency. The primary winding has a primary magnetizing inductance. A rectifier circuit is connected to at least one secondary winding of the isolation transformer to receive a secondary AC voltage responsive to the primary AC voltage. The rectifier circuit is configured to rectify the secondary AC voltage to provide a DC voltage to a load to cause a load current to flow through the load. A first current sensor is electrically coupled to the primary winding of the isolation transformer and is configured to sense a sensed current responsive to the primary current through the primary winding. The primary current through the primary winding is responsive to the load current through the DC load and is further responsive to a magnetizing current. The first current sensor is configured to provide a first feedback signal responsive to the sensed current. The first feedback signal includes a component responsive to the primary magnetizing current. A feedback signal generator outputs a second feedback signal. The feedback signal generator comprise an auxiliary winding of the isolation transformer. The auxiliary winding produces an auxiliary voltage responsive to the primary AC voltage. The feedback signal generator further comprises an auxiliary inductor having an inductance proportional to the same as the magnetizing inductance of the primary winding. The auxiliary inductor is responsive to the auxiliary voltage to produce an auxiliary current. The feedback signal generator further comprises an auxiliary sensing resistor that receives the auxiliary current and that produces a second feedback signal responsive to the auxiliary current. The second feedback signal has a component that offsets the component of the first feedback signal responsive to the magnetizing current. The second feedback signal is combined with the first feedback signal to produce a total feedback signal representing only the load current through the DC load. The DC-to-AC inverter is responsive to the total feedback signal to vary the frequency of the primary AC voltage to maintain the load current at a selected load current.

In certain embodiments in accordance with this aspect, the DC-to-AC inverter includes a switch controller configured to control the frequency of the primary AC voltage. The switch controller is configured to receive a reference signal having a value corresponding to a desired sensed primary current through the primary winding. The switch controller is configured to compare the value of the reference signal with the total feedback signal. The switch controller is configured to adjust the frequency of the primary AC voltage to reduce any difference between the total feedback signal and the value of the reference signal.

In certain embodiments in accordance with this aspect, the component of the first feedback signal is responsive to the primary magnetizing current has a first polarity. The second feedback signal has a polarity opposite the first polarity. The total feedback signal comprises a sum of the first feedback signal and the second feedback signal; and the second feedback signal offsets the component of the first feedback signal responsive to the primary magnetizing current such that the total feedback signal represents only the load current.

In certain embodiments in accordance with this aspect, the DC-to-AC inverter is configured to increase the frequency of the primary AC voltage when the sensed current is greater than a desired primary current; and the DC-to-AC inverter is further configured to decrease the frequency of the primary AC voltage when the sensed current is less than the desired primary current.

In certain embodiments in accordance with this aspect, the first current sensor comprises a first diode and a sensing resistor. The first diode enables the primary current to flow through the primary winding in first direction and through the sensing resistor during a first half of each cycle of the primary AC voltage. The sensing resistor produces a voltage responsive to the current flowing through the primary winding during the first half of each AC cycle of the primary AC voltage. In certain embodiments, the first current sensor further includes a second diode. The second diode enables the primary current to flow through the primary winding in a second direction during a second half of each AC cycle of the primary AC voltage. The primary current bypasses the sensing resistor when flowing in the second direction.

Another aspect of the embodiments disclosed herein is a method for controlling the current through a DC load in a secondary circuit wherein the secondary circuit is isolated from a primary circuit by an isolation transformer. The primary circuit includes a DC-to-AC inverter operating at a nominal operating frequency. The DC-to-AC inverter includes at least first semiconductor switch and a second semiconductor switch. The two switches are controlled by a switch controller. The method comprises sensing a primary current through the primary winding of the isolation transformer to produce a first feedback signal. The primary current has a first component responsive to a secondary current through the DC load and has a second component responsive to a primary magnetizing current caused by a magnetizing inductance of the primary winding. The method further comprises generating a second feedback signal by providing an auxiliary voltage from an auxiliary winding magnetically coupled to the primary winding; by applying the auxiliary voltage to an auxiliary inductor to generate an auxiliary current, wherein the auxiliary inductor has an inductance proportional to the magnetizing inductance of the primary winding such that the auxiliary current is proportional to the magnetizing current of the primary winding; and by sensing the auxiliary current to generate the second feedback signal, wherein the second feedback signal having a polarity opposite to a polarity of the first feedback signal. The method further comprises providing the first feedback signal and the second feedback signal to a summing junction to generate a total feedback signal, wherein the second feedback signal offsets the component of the first feedback signal responsive to the primary magnetizing current such that the total feedback signal represents only the component of the primary current responsive to the secondary current.

The method further comprises applying the total feedback signal to the switch controller. The switch controller is responsive to the total feedback signal to adjust the operating frequency to vary the primary current until the average DC magnitude of the total feedback signal is substantially equal to a desired average DC magnitude of the total feedback signal to cause the primary current to have a desired primary magnitude, the desired primary magnitude causing the current through the DC load to have a desired secondary magnitude.

In certain embodiments in accordance with this aspect, the switch controller increases the frequency when the average DC magnitude of the total feedback signal is greater than the desired average DC magnitude; and the switch controller decreases the frequency when the average DC magnitude of the total feedback signal is less than the desired average DC magnitude.

In certain embodiments in accordance with this aspect, the inductance of the auxiliary inductor is selected to be substantially equal to the magnetizing inductance of the primary winding.

Another aspect of the embodiments disclosed herein is a system for controlling the current through a DC load. The system comprises a switch controller having a first output and a second output, each output having an active state and an inactive state. The switch controller is configured to turn on only one of the outputs to the respective active state at any time. The switch controller is further configured to turn on each output once per cycle for a selected duration determined by a selected duty cycle. The switch controller is also configured to switch the first and second outputs at a nominal operating frequency. The system further comprises a first semiconductor switch having a control input connected to the first output of the switch controller, wherein the first semiconductor switch has a first terminal connected to a first voltage rail and has a second terminal connected to a common switch node. The system further comprises a second semiconductor switch having a control input connected to the second output of the switch controller, wherein the second semiconductor switch has a first terminal connected to the common switch node and has a second terminal connected to a second voltage rail. The system further comprises an isolation transformer having a primary winding AC-coupled between the common switch node and the second voltage rail. The primary winding has a magnetizing inductance. The isolation transformer has a secondary winding connected to an AC-to-DC rectifier. The AC-to-DC rectifier provides a secondary current to a DC load. The isolation transformer further has an auxiliary winding that produces an auxiliary voltage. the system further comprises a first current sensor electrically coupled to the primary winding of the isolation transformer to sense a first current responsive to the current through the primary winding, wherein the first current through the primary winding has a first component responsive to the current through the DC load and has a second component responsive to a magnetizing current caused by the magnetizing inductance of the primary winding. The first current sensor is configured to provide a first feedback signal responsive to the first and second components of the first current. The system further comprises a feedback signal generator coupled to the auxiliary winding of the isolation transformer to generate a second feedback signal. The feedback signal generator includes an auxiliary inductor that generates an auxiliary current responsive to the auxiliary voltage applied to the auxiliary inductor. The feedback signal generator further includes an auxiliary sensing resistor that senses the auxiliary current and that provides the second feedback signal proportional to the auxiliary current. The auxiliary inductor has an inductance selected to cause the auxiliary current proportional to the magnetizing current of the primary winding. The system further comprises a feedback summing circuit that receives the first feedback signal and the second feedback signal and that produces a total feedback signal. The feedback summing circuit is configured to offset the second component of the first feedback signal with the second feedback signal such that the total feedback signal is responsive only to the first component of the first current. The total feedback signal is provided to the switch controller, which is responsive to the total feedback signal to adjust the operating frequency until the total feedback signal has an average DC magnitude substantially equal to a desired magnitude. The desired magnitude is selected to produce a desired secondary current through the DC load.

In certain embodiments in accordance with this aspect, the switch controller is configured to increase the frequency when the sensed current is greater than a desired primary current; and the switch controller is further configured to decrease the frequency when the sensed current is less than the desired primary current.

BRIEF DESCRIPTIONS OF THE SEVERAL VIEWS OF THE DRAWINGS

DETAILED DESCRIPTION

Reference will now be made in detail to embodiments of the present disclosure, one or more drawings of which are set forth herein. Each drawing is provided by way of explanation of the present disclosure and is not a limitation. It will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

It is intended that the present disclosure covers such modifications and variations as come within the scope of the appended claims and their equivalents. Other objects, features, and aspects of the present disclosure are disclosed in the following detailed description. It is to be understood by one of ordinary skill in the art that the present discussion is a description of exemplary embodiments only and is not intended as limiting the broader aspects of the present disclosure.

Figure 2:
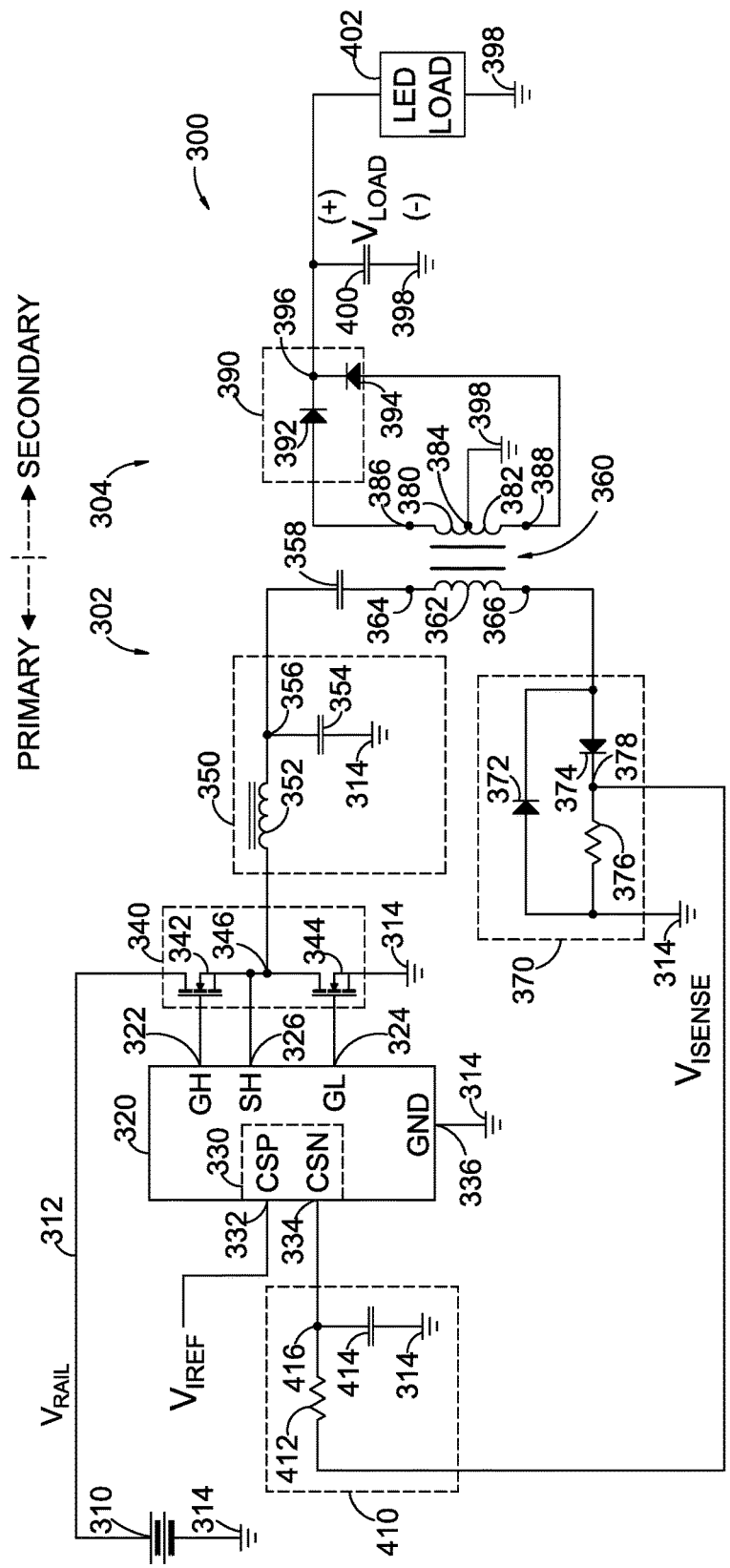
FIG. 2 illustrates an example of a first circuit configured to accomplish primary side sensing of secondary current.

FIG. 2 illustrates an example of a first circuit configured to accomplish primary side sensing of secondary current. A resonant-type half-bridge converter 300 in FIG. 3 has a primary circuit side 302 and a secondary circuit side 304. The converter is driven by a DC voltage source 310 connected between a DC input bus 312 (also labeled as $V_{RAIL}$) and a primary circuit ground reference 314. Although the DC voltage source is illustrated as a conventional battery, the voltage on the DC input bus may be provided by other sources, such as, for example, a power factor correction (PFC) stage, the DC output of a bridge rectifier, or the like, which are supplied from an AC source (not shown). The battery is representative of a variety of voltage sources that provide a substantially constant voltage on the DC input bus.

The converter 300 of FIG. 2 is configured around a UBA2014 drive IC 320, which is commercially available from NXP Semiconductor Company of Eindhoven, Netherlands. The drive IC includes a first drive output ($G_H$) on a first output terminal 322, a second drive output ($G_L$) on a second output terminal 324, and a source voltage reference terminal (SH) 326. The drive IC further includes a non-inverting input (CSP) for an internal average current sensor 330 on a first input terminal 332 and an inverting input (CSN) for the internal average current sensor on a second input terminal 334. A ground terminal 336 of the drive IC is connected to the primary circuit ground reference 314. Other terminals, such as the power input terminal to the drive IC are not shown in FIG. 2.

The first drive output (GH) on the first output terminal 322 of the drive IC 320 is connected to a control input terminal of a first switch 342 in a half-bridge switching circuit 340. The second drive output (GL) on the second output terminal 324 of the drive IC is connected to a control input terminal of a second switch 344 in the switching circuit. The switching circuit has a common switched node 346. In the illustrated embodiment, the first and second switches are n-channel MOSFETs, and the control input terminals are the gates of the MOSFETs. The two switches are connected in series between the DC input bus 312 and the primary circuit ground reference 314. The drain of the first switch is connected to the DC input bus. The source of the second switch is connected to the primary circuit ground reference. The source of the first switch is connected to the drain of the second switch at the common switched node of the switching circuit. The common switched node is also connected to the source voltage reference terminal (SH) 326 of the drive IC.

The common switched node 346 of the switching circuit 340 is connected to a first terminal of a resonant inductor 352 in a resonant circuit 350. A second terminal of the resonant inductor is connected to a first terminal of a resonant capacitor 354 at an output node 356 in the resonant circuit. A second terminal of the resonant capacitor is connected to the primary circuit ground reference 314. The resonant inductor and the resonant capacitor are the main resonant components of the resonant circuit, which is driven by the alternating switching of the common switched node to the DC input bus 312 by the first switch 342 and to the primary circuit ground reference by the second switch 344. The foregoing components operate as a DC-to-AC inverter to produce an AC voltage across the primary winding of the output isolation transformer.

The output node 356 of the resonant circuit 350 is connected to a first terminal of a DC blocking capacitor 358. A second terminal of the DC blocking capacitor is connected to a first (upper) terminal 364 of a primary winding 362 of an output isolation transformer 360. A second (lower) terminal 366 of the primary winding is connected to a first terminal of a current sensing circuit 370. A second terminal of the current sensing circuit is connected to the primary circuit ground reference 314.

The current sensing circuit 370 includes a first sensing circuit diode 372, a second sensing diode 374 and a current sensing resistor 376. The cathode of the first sensing circuit diode is connected to the first terminal of the current sensing circuit and is thereby connected to the second terminal 366 of the primary winding 362 of the output isolation transformer 360. The anode of the first sensing circuit diode is connected to the primary circuit ground reference 314. The second terminal of the primary winding and the cathode of the first sensing circuit diode are connected to the anode of the second sensing circuit diode. The cathode of the second sensing circuit diode is connected to a current sense node 378. The current sense node is connected to a first terminal of the current sensing resistor. The current sensing resistor has a second terminal connected to the primary circuit ground reference.

When current flows through the primary winding 362 of the output isolation transformer 360 in a first direction from the first (upper) terminal 364 to the second (lower) terminal 366 during a first half cycle of the switched voltage, the current flows through the second sensing circuit diode 374 and through the current sensing resistor 376 to the primary circuit ground reference 314. A voltage $V_{ISENSE}$ develops across the current sensing resistor proportional to the current flowing through the current sensing resistor such that a voltage on the current sense node 378 represents the magnitude of the current flowing through the primary winding during the first half cycle. When current flows through the primary winding in a second direction from the second (lower) terminal to the first (upper) terminal during a second half cycle of the switched voltage, the current flows through the first sensing circuit diode 372 and bypasses the current sensing resistor and the second sensing circuit diode. Thus, no voltage develops on the current sense node during the second half cycle.

The output isolation transformer 360 includes a first secondary winding 380 and a second secondary winding 382. The two secondary windings are electrically isolated from the primary winding 362. Respective first terminals of the two secondary windings are connected at a center tap 384. Respective second terminals 386, 388 of the two secondary windings are connected to first and second input terminals of a half-bridge rectifier 390. The half-bridge rectifier comprises a first rectifier diode 392 and a second rectifier diode 394. The second terminal of the first secondary winding is connected to the anode of the first rectifier diode. The second terminal of the second secondary winding is connected to the anode of the second rectifier diode. The cathodes of the two rectifier diodes are connected together at an output node 396 of the half-bridge rectifier. The center tap of the first and second secondary windings is connected to a secondary circuit ground reference 398.

The output node 396 of the half-bridge rectifier 390 is connected to a first terminal of an output filter capacitor 400. A second terminal of the output filter capacitor is connected to the secondary circuit ground reference 398. A load voltage ($V_{LOAD}$) is developed across the output filter capacitor at the output node of the half-bridge rectifier. The output node of the half-bridge rectifier is also connected to a first terminal of a load 402, which may comprise, for example, one or more light-emitting didoes (LEDs) that emit light when sufficient current passes through the LEDs. A second terminal of the load is connected to the secondary circuit ground reference.

The current sense node 374 of the current sensing circuit 370 is connected to an averaging filter 410 comprising a filter input resistor 412 and a filter capacitor 414. A first terminal of the filter input resistor is connected to the current sense node. A second terminal of the filter input resistor is connected to a first terminal of the filter capacitor. A second terminal of the filter capacitor is connected to the primary circuit ground reference 314. The common connection of the second terminal of the filter input resistor and the first terminal of the filter capacitor at an averaging filter output node 416 is connected to the second input terminal 334 of the drive IC 320 and is thus connected to the inverting input (CSN) of the internal average current sensor 330 of the drive IC. The averaging filter reduces high frequency noise on the current sense signal from the current sense node such that the signal applied to the inverting input of the internal average current sensor represents an average of the current sense signal over each switching cycle.

When the drive IC 320 operates to apply alternating drive voltages to the first switch 342 and the second switch 344, an AC voltage develops across the resonant capacitor 354. The voltage across the resonant capacitor may include a DC component; however, the DC blocking capacitor 358 transfers only the AC component of the energy stored in the resonant capacitor to the primary winding 362 of the output isolation transformer 360. The transferred energy is magnetically coupled from primary winding to the electrically isolated first and second secondary windings 380, 382. The first and second rectifier diodes 392, 394 rectify the AC energy from the secondary windings into DC energy. The DC energy is stored in the output filter capacitor 400 at a voltage determined by the amount of stored energy. Current from output filter capacitor is provided to the load 402 at a magnitude determined by the voltage on the half-bridge rectifier output node 396 and the resistance of the load.

Figure 1:
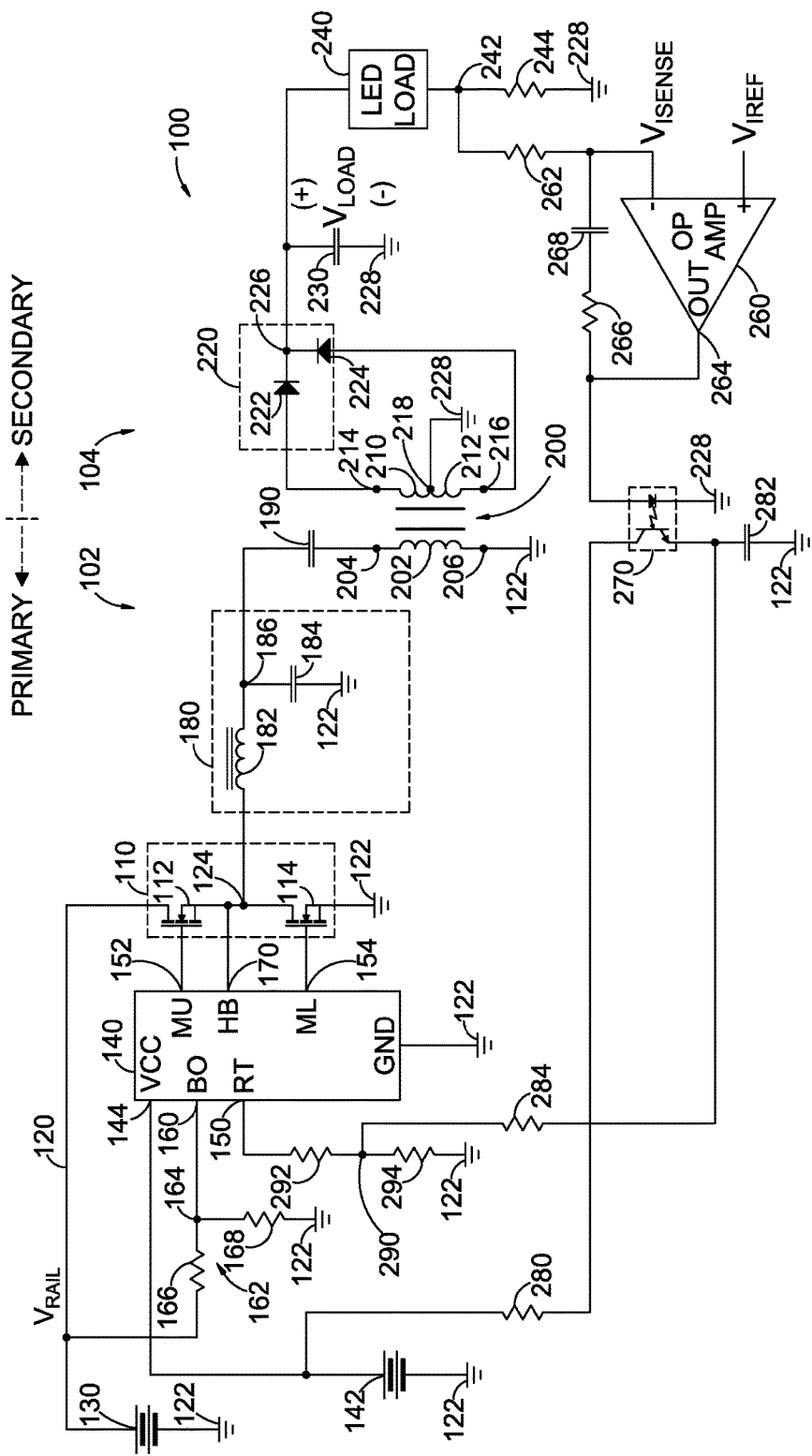
FIG. 1 illustrates a typical half-bridge resonant type DC-DC converter that senses secondary current through a load and couples a signal representing the sensed secondary current to the primary side of the converter via an isolation device.

Unlike the previously described converter 100 in FIG. 1, the converter 300 in FIG. 2 does not directly sense the current flowing through the load 402 in the secondary side 304 of the converter circuit. Rather as described below, the load current is sensed indirectly on the primary side 302 of the converter circuit. Thus, as illustrated in FIG. 2, the primary side and the secondary side are electrically isolated from each other. Furthermore, no coupling components (e.g., the photocoupler 270 of FIG. 1) are required to communicate signals from the secondary side to the primary side of the converter circuit.

The internal average current sensor 330 in the drive IC 320 is responsive to the feedback voltage on the second input terminal (inverting input (CSN)) 334 in comparison to a reference voltage ($V_{IREF}$) on the first input terminal (non-inverting input (CSP)) 332. The output of the internal average current sensor directly controls the operating frequency of the drive IC to control the first and second drive outputs on the first and second output terminals 322, 324 in response to the relative magnitudes of the voltages on the two input terminals. In FIG. 2, the current through the primary winding 362 of the output isolation transformer 360 is sensed by the second sensing circuit diode 372 and the current sensing resistor 376. The current sensing signal is half of the total current that goes through the output isolation transformer primary winding because the current sensing resistor senses current only during one of the two half cycles of the AC voltage.

Figure 3:
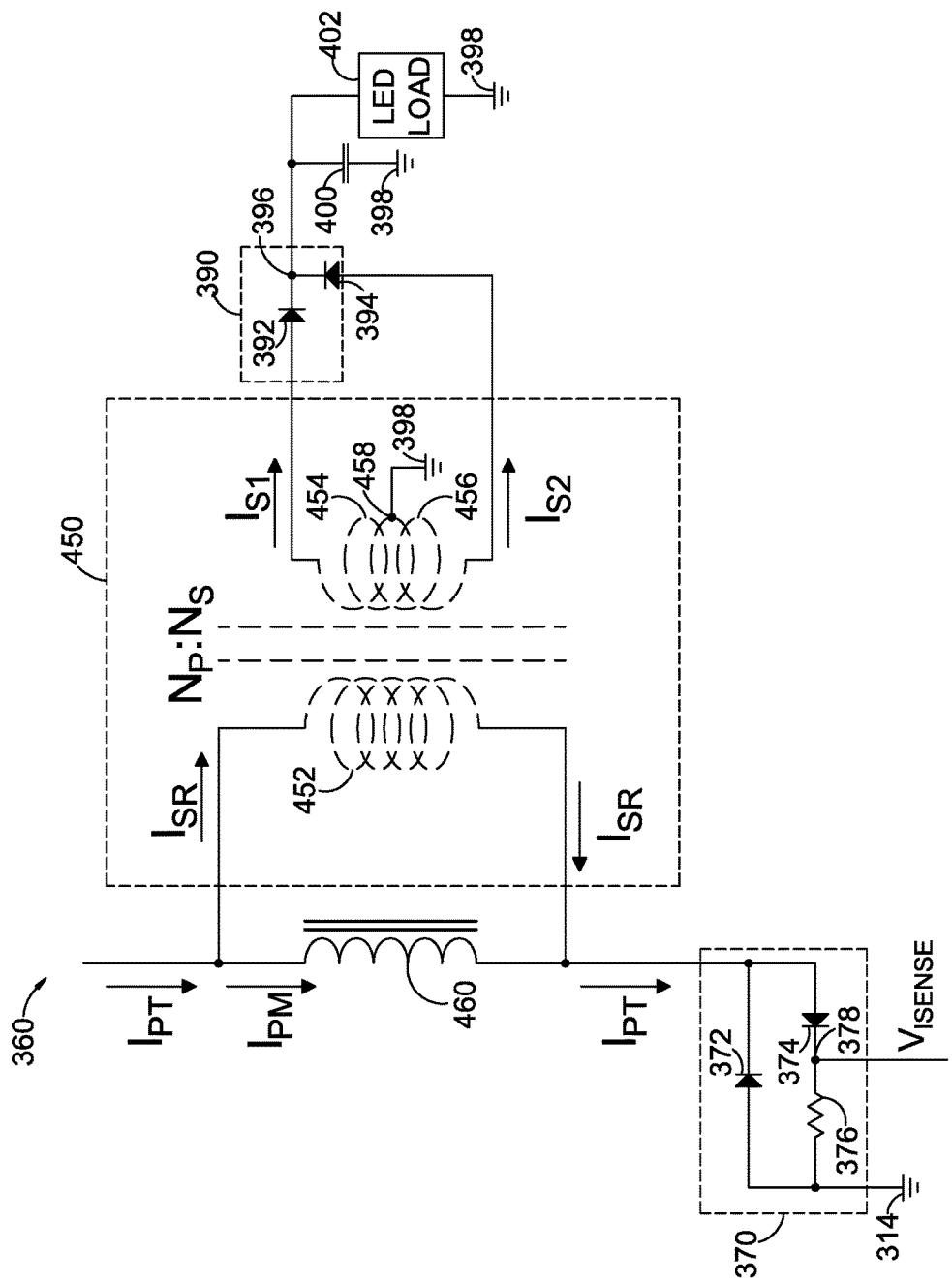
FIG. 3 illustrates an equivalent circuit representation of the output isolation transformer of FIG. 2 as an ideal (lossless) transformer with a representation of a magnetizing inductance across the primary windings.

As illustrated in FIG. 3, the output isolation transformer 360 of FIG. 2 can be represented as an ideal (lossless) transformer 450 with an ideal primary winding 452, a first ideal secondary winding 454 and a second ideal secondary winding 456. The first and second ideal secondary windings are connected at a center tap 458, which is connected to the secondary circuit ground reference 398, as described above. The first and second secondary windings are connected to the half-bridge rectifier 390, which produces the secondary current $I_S$ provided to the load 402. The secondary current Is includes a first secondary current component $I_{S1}$ provided by the first secondary winding and a second secondary current component $I_{S2}$ provided by the second secondary winding. The ratio N of the number of turns $N_S$ of each secondary winding with respect to the number of turns $N_P$ of the primary winding (e.g., $N=N_S/N_P$) determines the magnitude of the secondary current reflected into the primary winding (e.g., $I_{SR}=N \times I_S$). For example, if N=5, the secondary current reflected into the primary winding will be 5 times the actual secondary current. The primary winding of the actual output isolation transformer also receives a magnetizing current $I_{PM}$, which passes through a primary magnetizing inductance $L_M$. The primary magnetizing inductance $L_M$ is represented in FIG. 3 as an inductor 460 connected in parallel with the "lossless" primary winding of the ideal transformer. The total current $I_{PT}$ through the primary winding 362 of the actual output isolation transformer 360 is the total of the reflected secondary current $I_{SR}$ and the primary magnetizing current $I_{PM}$ (e.g., $I_{PT}=I_{PM}+I_{SR}$). As shown in the following paragraphs, the primary magnetizing current $I_{PM}$ added to the reflected secondary current $I_{SR}$ causes the total primary current $I_{PT}$ to be nonlinear with respect to the secondary current such that the current sensed by the current sensing circuit in FIG. 2 produces an inaccurate representation of the actual secondary current.

The total current $I_{PT}$, which passes through the actual primary winding and through the sensing resistor 376, includes the magnetizing current $I_{PM}$ through the inductor 460 added to the reflected secondary current $I_{SR}$ through the ideal primary winding 452 as follows:

$$I_{PT}=I_{PM}+I_{SR} \tag{1}$$

The magnetizing current in Equation (1) is defined as:

$$I_{PM} = \frac{V_P}{2 \cdot \pi \cdot f \cdot L_P} \tag{2}$$

In Equations (1) and (2):

$V_P$ is the AC voltage across the actual primary winding 362 of the output isolation transformer 360 and thus across the ideal primary winding 452 of the ideal transformer 450;

f is the operating frequency; and $L_M$ is the primary winding magnetizing inductance of the output isolation transformer as represented by the inductor 460 in FIG. 3.

The reflected secondary current on primary side is:

$$I_{SR}=N \cdot I_S \tag{3}$$

In Equation (3), N is defined as the turns ratio of the number of secondary turns, $N_S$ with respect to the number of primary turns $N_P$ as follows:

$$N = \frac{N_S}{N_P}$$

The output load DC current $I_{LOAD}$ through the load 402 is the average value of the full rectified secondary AC current $I_S$ in accordance with the following Equation (4):

$$I_{LOAD} = \frac{2}{\pi} \cdot I_S = \frac{2}{\pi} \cdot I_{SR} \cdot \frac{1}{N} \tag{4}$$

In Equation (4), $I_S$ is the peak amplitude of the secondary winding current. From Equation (4), $I_{SR}$ can be determined as follows:

$$I_{SR} = N \cdot I_{LOAD} \cdot \frac{\pi}{2} \tag{5}$$

The phase relationship between $I_S$, $I_{S1}$ and $I_{S2}$ is given as:

$$\vec{I}_S = \vec{I}_{S1} + \vec{I}_{S2} \tag{6}$$

In Equation (5), the total secondary current $I_S$ the total vector current of $I_{S1}$ (from the first secondary winding 380) and $I_{S2}$ (from the second secondary winding 382).

Equations (2) and (5) can be substituted into Equation (1) to provide the following relationship:

$$I_{PT} = \frac{V_P}{2 \cdot \pi \cdot f \cdot L_P} + \left( N \cdot I_{LOAD} \cdot \frac{\pi}{2} \right) \tag{7}$$

Equation (7) illustrates the effect of the two components $I_{PM}$ and $I_{SR}$ of the total primary current $I_{PT}$ on the voltage $V_{ISENSE}$ generated by the current sensing circuit 370 of FIG. 2. As discussed above, only one half-cycle of the total primary current $I_{PT}$ passes through the current sensing resistor 376. The half-cycle during which current flows through the current sensing resistor is referred to herein as the positive half-cycle. Accordingly, the voltage developed across the current sensing resistor has a positive voltage and is thus a positive sensing signal when the current flows through the primary winding 362 from the first (upper terminal) 364 to the second (lower) terminal 366 in the forward direction of the second sensing diode 374. As further discussed above, the first sensing diode 372 causes the current that flows from the second terminal (lower) to the first (upper) terminal of the primary winding during the other half-cycle (the negative half-cycle) to bypass the current sensing resistor.

The current sensing resistor 376 has a resistance $R_{376}$. An average voltage signal ($V_{SENSE\_1\_AVG}$) is developed across the current sensing resistor in accordance with the following Equation (8):

$$V_{SENSE\_1\_AVG} = \frac{1}{2} \cdot \frac{2}{\pi} (I_{PT} \cdot R_{376}) \tag{8}$$

$$= \frac{R_{376}}{\pi} \cdot (I_{PM} + I_{SR})$$

$$= \frac{R_{376}}{\pi} \cdot \left( \frac{V_P}{2 \cdot \pi \cdot f \cdot L_{PM}} + \left( N \cdot I_{LOAD} \cdot \frac{\pi}{2} \right) \right)$$

As shown Equation (8), the magnetizing current factor ($V_P/(2 \cdot \Pi \cdot f \cdot L_{PM})$) causes the relationship between the averaged voltage signal and the load current to be nonlinear because the magnetizing current is also multiplied by the resistance of the sensing resistor to produce the sensed voltage. Accordingly, the sensed voltage is not directly proportional to the secondary (load) current.

If the magnetizing current in Equation (8) is canceled, then $V_{SENSE\_AVG}$ is directly proportional to the secondary current, $I_{LOAD}$, as follows:

$$V_{SENSE\_AVG} = R_{I\_SENSE} \cdot \frac{N}{2} \cdot I_{LOAD} \quad (9)$$

Figure 4:
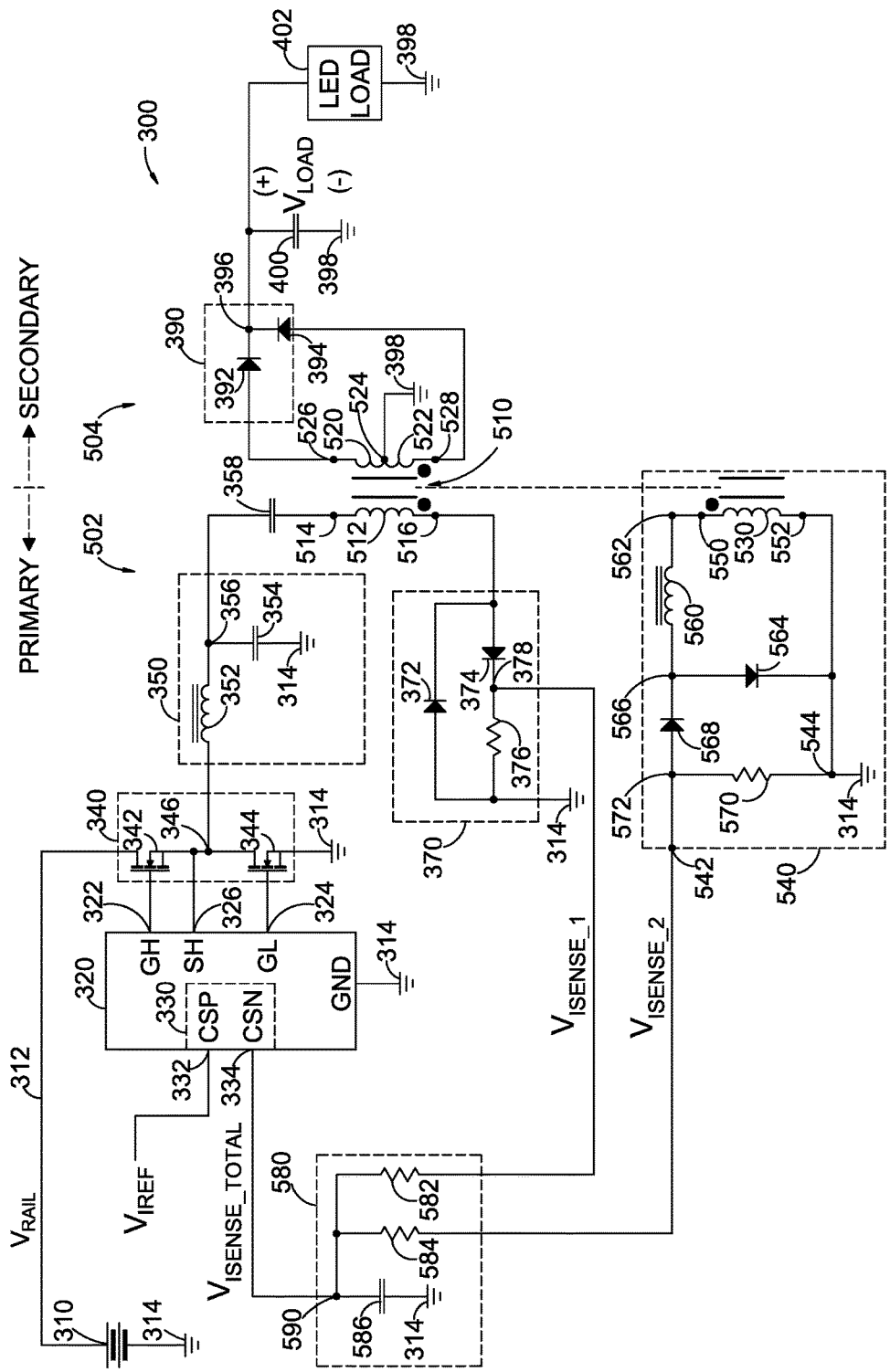
FIG. 4 illustrates an improved half-bridge resonant type DC-DC converter that includes a second feedback signal generator ("artificial" current source) to generate a second sensed signal having a magnitude and polarity selected to offset the effect of the magnetizing current in the primary windings of the output isolation transformer.

A converter circuit 500 in FIG. 4 includes improvements that enable the reflected secondary current to be sensed in the primary with greater accuracy by eliminating or substantially eliminating the effect of the primary magnetizing current in the sensed current. In the converter circuit of 500 FIG. 4, elements corresponding to elements of the converter circuit 300 of FIG. 2 are numbered as before and function as previously described. The different elements and different operational characteristics are described below. The converter circuit of FIG. 4 has a primary circuit side 502 and a secondary circuit side 504, which are isolated by an isolation transformer as described below.

In the converter circuit 500 of FIG. 4, the output isolation transformer 360 of FIG. 2 is replaced with a modified output isolation transformer 510. The modified output isolation transformer includes a primary winding 512 having a first (upper) terminal 514 and a second (lower) terminal 516. The modified output isolation transformer further includes a first secondary winding 520 and a second secondary winding 522. The first terminals of the two secondary windings are connected together at a center tap 524, which is connected to the second circuit ground reference 398 as before. The first secondary winding and the second secondary winding have respective second terminals 526, 528, which are connected to the anodes of diodes 392, 394 in the half-bridge rectifier 390 as previously described.

The modified output isolation transformer 510 of FIG. 4 further includes an auxiliary winding 530, which is incorporated into a second feedback signal generator 540. The second feedback signal generator may also be referred to as an "artificial" current source as discussed below.

Except for the structure and operation of the second feedback signal generator 540, the converter circuit 500 of FIG. 4 operates substantially the same as the converter circuit 300 of FIG. 2. The components in the primary circuit side 502 operate as a DC-to-AC inverter to produce an AC voltage across the primary winding 512 of the modified output isolation transformer 510. The secondary windings 520, 522 and the half-bridge rectifier 390 produce the load current to the load 402. The current flowing through the load is reflected from the secondary windings to the primary winding to produce the reflected secondary current $I_{SR}$ in the primary winding. Furthermore, the primary winding magnetizing current $I_{PM}$ flows through the primary winding as previously described. The total primary current $I_{PT}$ flows through the second sensing diode 374 and the current sensing resistor 376 of the current sensing circuit 370 during each positive half-cycle when the current flows from the first terminal 514 to the second terminal 516 of the primary winding. No current flows through the current sensing resistor during the negative half-cycles. In the converter circuit 500 of FIG. 4, the voltage developed on the current sense node 378 during each positive half-cycle is identified as $V_{ISENSE\_1}$ to distinguish the sensed voltage from a second sensed voltage described below. As described above, the voltage sensed on the sense node of the current sensing circuit includes a voltage component caused by the primary winding magnetizing current $I_{PM}$ that flows through the current sensing resistor.

The second feedback signal generator 540 develops a second feedback voltage $V_{ISENSE\_2}$ on an output terminal 542. The second feedback signal generator has a ground terminal 544, which is connected to the primary circuit ground reference 314. As discussed above, the auxiliary winding 530 of the modified output isolation transformer 510 is incorporated into the second feedback signal generator. The auxiliary winding has a first (upper) terminal 550 and a second (lower) terminal 552. As shown in FIG. 4, a dot is positioned proximate to the first (upper) terminal of the auxiliary winding. A corresponding dot is positioned proximate to the second (lower) terminal 516 of the primary winding 512. The two dots represent the polarity of the coupling of the primary winding to the auxiliary winding such that when current flows into the second (dotted) terminal of the primary winding, current flows out of the first (dotted) terminal of the auxiliary winding. Similarly, when current flows into the first (undotted) terminal of the primary winding, current flows out of the second (undotted) terminal of the auxiliary winding. The second terminal 528 of the second secondary winding 522 is dotted in the illustrated embodiment; however, the dot may also be on the second terminal 526 of the first secondary winding 520.

The second (undotted) terminal 552 of the auxiliary winding 530 of the modified output isolation transformer 510 is connected to the primary circuit ground reference 314. The first (dotted) terminal 550 of the auxiliary winding is connected to first terminal of a current source inductor 560 at a first current source node 562. A second terminal of the current source inductor is connected to the anode of a first current source diode 564 at a second current source node 566. The cathode of the first current source diode is connected to the primary circuit ground reference. The second terminal of the current source inductor and the anode of the first current source diode at the second current source node are connected to the cathode of a second current source diode 568. The anode of the second current source diode is connected to a first terminal of a current source sensing resistor 570 at third current source node 572, which is connected to the output terminal 542 of the second feedback signal generator 540. As described below, a voltage $V_{ISENSE\_2}$ is developed on the output terminal of the second feedback signal generator. A second terminal of the current source sensing resistor is connected to the primary circuit ground reference.

Because of the particular connections of the respective dotted terminals of the primary winding 512 and the auxiliary winding 530 of the modified output isolation transformer 510, the voltage developed on the first current source node 562 with respect to the primary circuit ground reference 314 in the second feedback signal generator 540 is 180 degrees out of phase with the voltage on the first (undotted) terminal 514 of the primary winding 512. For example, when the primary voltage on the first terminal of the primary winding is high with respect to the primary circuit ground reference during each positive half-cycle, the voltage on the second (dotted) terminal 516 of the primary winding is low (e.g., relatively negative) with respect to the first terminal. This causes the voltage on the first (dotted) terminal 550 of the auxiliary winding to be negative with respect to the second (undotted) terminal 552 of the auxiliary winding. When the first terminal of the auxiliary winding is negative with respect to the second terminal, current flows from the second terminal through the current sensing resistor 570 to the anode of the second current source diode 568, through the inductor 560, and back to the first terminal of the auxiliary winding. This causes the voltage $V_{ISENSE\_2}$ developed on the third current source node (output terminal) 572 of the second feedback signal generator to be negative with respect to the primary circuit ground reference.

When the polarity of the voltage applied to the primary winding 512 is reversed such that the voltage on the first (undotted) terminal 514 of the primary winding is negative with respect to the voltage (e.g., ground) on the second (dotted) terminal 516 of the primary winding, the voltage on the first (dotted) terminal 550 of the auxiliary winding 530 is positive with respect to the second (undotted) terminal 552. Accordingly, current flows through the current source inductor 560 to the anode of the first current source diode 564 and to ground. The second current source diode 568 is reverse biased such that no current flows through the current source sensing resistor 570 and no voltage develops across the current source sensing resistor.

The auxiliary winding 530 has a number of turns $N_{AUX}$. The number of turns of the auxiliary winding is selected in accordance with the number of turns of the primary winding 512 to provide a desired primary-to-auxiliary turns ratio $N_{P-A}$, wherein $N_{P-A}=N_P/N_{AUX}$. For example, in one embodiment, the turns ratio $N_{P-A}$ may be 5-to-1.

An inductance $L_{CS}$ of the current source inductor 560 is selected to cause the current sensed by current source sensing resistor 570 to be substantially equal to the magnetizing current $I_{PM}$ of the primary winding 512. The inductance $L_{CS}$ is selected in accordance with the primary magnetizing inductance $L_{PM}$ and the primary-to-auxiliary turns ratio NP-A as follows:

$$L_{CS} = \frac{L_{PM}}{N_{P-A}} \quad (10)$$

For example, if the primary-to-auxiliary turns ratio $N_{P-A}$ is 5 and if the primary winding magnetizing inductance $L_{PM}$ is determined to be 5 millihenries, the inductance $L_{CS}$ of the current source inductor 560 is selected to be approximately 1 millihenry. Accordingly, the inductance $L_{CS}$ is proportional to the magnetizing inductance $L_{PM}$.

A current $I_{CS}$ flows through the current source inductor 560 during each positive half-cycle of a voltage $V_P$ applied to the primary winding 512 of the output isolation transformer 510 in response to a negative voltage $V_{AUX}$ developed across the auxiliary winding 530. $I_{CS}$ is calculated as:

$$I_{CS} = \frac{V_{AUX}}{2 \cdot \pi \cdot f \cdot L_{CS}} = \frac{\frac{V_P}{N_{P-A}}}{2 \cdot \pi \cdot f \cdot \frac{L_{PM}}{N_{P-A}}} = \frac{V_P}{2 \cdot \pi \cdot f \cdot L_{PM}} \quad (11)$$

When the current ICS flows through the current source inductor 560 while the voltage $V_{AUX}$ across the auxiliary winding 530 is negative, the current also flows through the current sensing resistor current source sensing resistor 570 from the primary circuit ground reference 314 to the third current source node 572 and the output terminal 542 of the second feedback signal generator 540. The current flowing in this direction causes the voltage $V_{ISENSE\_2}$ on the output terminal to be negative.

The half-cycle of current through the current source inductor 560 and through the current source sensing resistor 570 is generally sinusoidal such that an average DC voltage $V_{ISENSE\_2\_AVG}$ developed on the output terminal of the second feedback signal generator 540. The voltage is responsive to the magnitude of the current $I_{CS}$ and a resistance $R_{570}$ of the current source sensing resistor in accordance with the following calculation:

$$V_{ISENSE\_2\_AVG} = -\frac{1}{2} \cdot \frac{2}{\pi}(I_{CS} \cdot R_{570}) = \frac{-1}{\pi} \cdot R_{570} \cdot \frac{V_P}{2 \cdot \pi \cdot f \cdot L_{PM}} \quad (12)$$

It can now be seen why the second feedback signal generator 540 is also identified as an "artificial" current source. The current through the current source sensing resistor 570 is only generated to produce the voltage $V_{ISENSE\_2}$ proportional to the magnetizing current $I_{PM}$ of the primary winding 512 of the output isolation transformer 510. The current is not provided as a source to any other components in the converter circuit 500.

The voltage $V_{ISENSE\_1}$ on the current sense node 378 of the current sensing circuit 370 and the voltage $V_{ISENSE\_2}$ on the output terminal 542 of the second feedback signal generator 540 are provided as feedback input signals to an averaging filter 580. The averaging filter comprises a first filter input resistor 582, a second filter input resistor 584, and a filter capacitor 586. In the illustrated embodiment, the resistance of each of the first and second filter input resistors is approximately 100,000 ohms, and the capacitance of the filter capacitor is approximately 1 microfarad.

The voltage $V_{ISENSE\_1}$ is connected to a first terminal of the first filter input resistor. The voltage $V_{ISENSE\_2}$ is connected to a first terminal of the second filter input resistor. Respective second terminals of the two filter input resistors are connected together and are connected to a first terminal of the filter capacitor at an averaging filter output node 590. A second terminal of the filter capacitor is connected to the primary circuit ground reference 314. The averaging filter output node is connected to the second input terminal (inverting input (CSN)) 334 of the drive IC 320. The drive IC is responsive to a voltage $V_{ISENSE\_TOTAL}$ on the second input terminal to control the switching frequency of the gate control signals applied to the first switch 342 and the second switch 344 as described above.

The averaged voltage $V_{ISENSE\_TOTAL\_AVG}$ on the output node 590 of the averaging filter 560 is responsive to the averages of the two sense voltages $V_{ISENSE\_1\_AVG}$ and $V_{ISENSE\_2\_AVG}$ and the values $R_{582}$ and $R_{584}$ of the first filter input resistor 582 and the second filter input resistor 584, respectively, in accordance with the following relationship:

$$V_{ISENSE\_TOTAL\_AVG} = \frac{V_{ISENSE\_1\_AVG} \cdot R_{584}}{R_{582} + R_{584}} + \frac{V_{ISENSE\_2\_AVG} \cdot R_{582}}{R_{552} + R_{584}} \quad (13)$$

If the resistance $R_{582}$ of the first filter input resistor 582 is equal or substantially equal to the resistance $R_{584}$ of the second filter input resistor 584 (e.g., each resistor having a resistance of approximately 100,000 ohms), Equation (13) can be reduced to:

$$V_{ISENSE\_TOTAL\_AVG} = \frac{1}{2}(V_{ISENSE\_1\_AVG} + V_{ISENSE\_2\_AVG}) \quad (14)$$

The resistances of the two filter input resistors 582, 584 are selected to draw very little current from the respective sensing nodes so that the averaged sensed voltages are substantially unaffected by the current flowing through the two filter input resistors. The filter capacitor reduces noise on the averaging filter output node 590 of the averaging filter 580 and at least partially averages the voltages from the two sensing nodes. In one example of the averaging filter, the filter capacitor has a capacitance of approximately 1 microfarad.

As discussed above, the averaged voltage $V_{ISENSE\_TOTAL\_AVG}$ is provided from the output node 590 of the averaging filter 580 to the second input terminal (inverting input (CSN)) 334 of the drive IC 320. The internal average current sensor 330 in the drive IC compares the averaged voltage on the second input terminal to the reference voltage $V_{IREF}$ on the first input terminal non-inverting input (CSP) 332 of the drive IC to determine whether to increase the switching frequency or to decrease the switching frequency as described above.

The foregoing relationships between the voltages generated by the two sensed currents are used to eliminate the effect of the primary winding magnetizing current $I_{PM}$ as described below.

Starting with Equation (14), the right side of Equation (8) is substituted for the magnitude of $V_{ISENSE\_1\_AVG}$ and the right side of Equation (12) is substituted for the magnitude of VISENSE_2_AVG as follows:

$$V_{ISENSE\_TOTAL\_AVG} = \frac{1}{2}(V_{ISENSE\_1\_AVG} + V_{ISENSE\_2\_AVG}) \quad (15)$$
$$= \frac{1}{2}\left[\frac{R_{376}}{\pi} \cdot \left(\frac{V_P}{2 \cdot \pi \cdot f \cdot L_{PM}} + \left(N \cdot I_{LOAD} \cdot \frac{\pi}{2}\right)\right) - \frac{R_{570}}{\pi} \cdot \frac{V_P}{2 \cdot \pi \cdot f \cdot L_{PM}}\right]$$

If the resistance $R_{570}$ of the current source sensing resistor 570 is selected to be equal to the resistance $R_{376}$ of the current sensing resistor 376 (e.g., each resistance is approximately 0.1 ohm), Equation (15) is reduced to the following:

$$V_{ISENSE\_TOTAL\_AVG} = \quad (16)$$
$$\frac{1}{2}\left[\frac{R_{376}}{\pi} \cdot \left(\frac{V_P}{2 \cdot \pi \cdot f \cdot L_{PM}} + \left(N \cdot I_{LOAD} \cdot \frac{\pi}{2}\right)\right) - \frac{R_{376}}{\pi} \cdot \frac{V_P}{2 \cdot \pi \cdot f \cdot L_{PM}}\right]$$

The first and last terms on the right side of Equation (16) cancel such that:

$$V_{ISENSE\_TOTAL\_AVG} = \frac{1}{4}[R_{376} \cdot (N \cdot I_{LOAD})] \quad (17)$$

As shown in Equation (16), the sensed voltage generated by the second feedback signal generator 540 offsets the primary winding magnetizing current such that the sensed voltage representing the reflected load current is directly proportional to the load current rather than being nonlinear. The sensed voltage remains proportional to the load current over a broad range of load conditions and over a broad range of switching frequencies.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for controlling the current through a DC load, the system comprising:
a DC-to-AC inverter configured to generate a primary AC voltage to a primary winding of an isolation transformer, the primary AC voltage having a nominal frequency, the primary winding having a primary magnetizing inductance;
a rectifier circuit connected to at least one secondary winding of the isolation transformer to receive a secondary AC voltage responsive to the primary AC voltage, the rectifier circuit configured to rectify the secondary AC voltage to provide a DC voltage to the DC load to cause a load current to flow through the DC load;
a first current sensor electrically coupled to the primary winding of the isolation transformer and configured to sense a sensed current responsive to the primary current through the primary winding, the primary current through the primary winding responsive to the load current through the DC load and further responsive to a magnetizing current, the first current sensor configured to provide a first feedback signal responsive to the sensed current, the first feedback signal including a component responsive to the primary magnetizing current; and
a feedback signal generator that outputs a second feedback signal, the feedback signal generator comprising:
an auxiliary winding of the isolation transformer, the auxiliary winding producing an auxiliary voltage responsive to the primary AC voltage;
an auxiliary inductor having an inductance proportional to the magnetizing inductance of the primary winding, the auxiliary inductor responsive to the auxiliary voltage to produce an auxiliary current;
an auxiliary sensing resistor that receives the auxiliary current and that produces a second feedback signal responsive to the auxiliary current, the second feedback signal having a component that offsets the component of the first feedback signal responsive to the magnetizing current, the second feedback signal combined with the first feedback signal to produce a total feedback signal representing only the load current through the DC load, the DC-to-AC inverter responsive to the total feedback signal to vary the frequency of the primary AC voltage to maintain the load current at a selected load current.

2. The system as defined in claim 1, wherein:
the DC-to-AC inverter includes a switch controller configured to control the frequency of the primary AC voltage;
the switch controller is configured to receive a reference signal having a value corresponding to a magnitude of the total feedback signal representing the selected load current;
the switch controller is configured to compare the value of the reference signal with the total feedback signal; and the switch controller is configured to adjust the frequency of the primary AC voltage to reduce any difference between the total feedback signal and the value of the reference signal.

3. The system as defined in claim 1, wherein:
the component of the first feedback signal responsive to the primary magnetizing current has a first polarity;
the second feedback signal has a polarity opposite the first polarity; and
the total feedback signal comprises a sum of the first feedback signal and the second feedback signal, the second feedback signal offsetting the component of the first feedback signal responsive to the primary magnetizing current such that the total feedback signal represents only the load current.

4. The system as defined in claim 1, wherein:
the DC-to-AC inverter is configured to increase the frequency of the primary AC voltage when the total feedback signal represents a load current greater than the selected load current; and
the DC-to-AC inverter is further configured to decrease the frequency of the primary AC voltage when the total feedback signal represents a load current less than the selected load current.

5. The system as defined in claim 1, wherein the first current sensor comprises a first diode and a primary sensing resistor, the first diode enabling the primary current to flow through the primary winding in first direction and through the primary sensing resistor during a first half of each cycle of the primary AC voltage, the primary sensing resistor producing a voltage responsive to the current flowing through the primary winding during the first half of each AC cycle of the primary AC voltage.

6. The system as defined in claim 5, further comprising a second diode, the second diode enabling the primary current to flow through the primary winding in a second direction during a second half of each AC cycle of the primary AC voltage, the primary current bypassing the primary sensing resistor when flowing in the second direction.

7. A method for controlling a current through a DC load in a secondary circuit wherein the secondary circuit is isolated from a primary circuit by an isolation transformer, the primary circuit including a DC-to-AC inverter operating at a nominal operating frequency, the DC-to-AC inverter including at least a first semiconductor switch and a second semiconductor switch, the two switches controlled by a switch controller, the method comprising:
sensing a primary current through the primary winding of the isolation transformer to produce a first feedback signal, the primary current having a first component responsive to a secondary current through the DC load and having a second component responsive to a primary magnetizing current caused by a magnetizing inductance of the primary winding, the first feedback signal having a first component responsive to the secondary current through the DC load and having a second component responsive to the primary magnetizing current;
generating a second feedback signal by:
providing an auxiliary voltage from an auxiliary winding magnetically coupled to the primary winding;
applying the auxiliary voltage to an auxiliary inductor to generate an auxiliary current, the auxiliary inductor having an inductance proportional to the magnetizing inductance of the primary winding such that the auxiliary current is proportional to the magnetizing current of the primary winding; and
sensing the auxiliary current to generate the second feedback signal, the second feedback signal having a polarity opposite to a polarity of the first feedback signal;
providing the first feedback signal and the second feedback signal to a summing junction to generate a total feedback signal, the second feedback signal offsetting the second component of the first feedback signal responsive to the primary magnetizing current such that the total feedback signal represents only the first component of the first feedback signal responsive to the secondary current; and
applying the total feedback signal to the switch controller, the switch controller responsive to the total feedback signal to adjust the operating frequency to vary the primary current until an average DC magnitude of the total feedback signal is substantially equal to a desired average DC magnitude of the total feedback signal to cause the primary current to have a desired primary magnitude, the desired primary magnitude causing the current through the DC load to have a desired secondary magnitude.

8. The method as defined in claim 7, wherein:
the switch controller increases the frequency when the average DC magnitude of the total feedback signal is greater than the desired average DC magnitude; and
the switch controller decreases the frequency when the average DC magnitude of the total feedback signal is less than the desired average DC magnitude.

9. The method as defined in claim 7, wherein the inductance of the auxiliary inductor is selected to be substantially equal to the magnetizing inductance of the primary winding.

10. A system for controlling a current through a DC load, the system comprising:
a switch controller having a first output and a second output, each output having an active state and an inactive state, the switch controller configured to turn on only one of the outputs to the respective active state at any time, the switch controller further configured to turn on each output once per cycle for a selected duration determined by a selected duty cycle, the switch controller also configured to switch the first and second outputs at a nominal operating frequency;
a first semiconductor switch having a control input connected to the first output of the switch controller, the first semiconductor switch having a first terminal connected to a first voltage rail and having a second terminal connected to a common switch node;
a second semiconductor switch having a control input connected to the second output of the switch controller, the second semiconductor switch having a first terminal connected to the common switch node and having a second terminal connected to a second voltage rail;
an isolation transformer having a primary winding AC-coupled between the common switch node and the second voltage rail, the primary winding having a magnetizing inductance, the isolation transformer having a secondary winding connected to an AC-to-DC rectifier, the AC-to-DC rectifier providing a secondary current to a DC load, the isolation transformer further having an auxiliary winding that produces an auxiliary voltage;
a first current sensor electrically coupled to the primary winding of the isolation transformer to sense a first current responsive to the current through the primary winding, the first current through the primary winding having first component responsive to the current through the DC load and having a second component responsive to a magnetizing current caused by the magnetizing inductance of the primary winding, the first current sensor configured to provide a first feedback signal responsive to the first and second components of the first current, the first feedback signal having a first component responsive to the current through the DC load and having second component responsive to the magnetizing current;

a feedback signal generator coupled to the auxiliary winding of the isolation transformer to generate a second feedback signal, the feedback signal generator including an auxiliary inductor that generates an auxiliary current responsive to the auxiliary voltage applied to the auxiliary inductor, the feedback signal generator further including an auxiliary sensing resistor that senses the auxiliary current and that provides the second feedback signal proportional to the auxiliary current, the auxiliary inductor having an inductance selected to cause the auxiliary current to be proportional to the magnetizing current of the primary winding; and a feedback summing circuit that receives the first feedback signal and the second feedback signal and that produces a total feedback signal, the feedback summing circuit configured to offset the second component of the first feedback signal with the second feedback signal such that the total feedback signal is responsive only to the first component of the first feedback signal responsive to the current through the DC load, the total feedback signal provided to the switch controller, the switch controller responsive to the total feedback signal to adjust the operating frequency until the total feedback signal has an average DC magnitude substantially equal to a desired magnitude, the desired magnitude selected to produce a desired secondary current through the DC load.

11. The system as defined in claim 10, wherein:
the switch controller is configured to increase the frequency when the average DC magnitude of the total feedback signal is greater than the desired magnitude of the total feedback signal; and
the switch controller is further configured to decrease the frequency when the average DC magnitude of the total feedback signal is less than the desired magnitude of the total feedback signal.

12. The system as defined in claim 10, wherein:
the switch controller is configured to receive a reference signal having a value corresponding to the desired magnitude of the total feedback signal;
the switch controller is configured to compare the value of the reference signal with the total feedback signal; and
the switch controller is configured to adjust the frequency of the primary AC voltage to reduce any difference between the total feedback signal and the value of the reference signal.

13. The system as defined in claim 10, wherein:
the second component of the first feedback signal responsive to the primary magnetizing current has a first polarity;
the second feedback signal has a polarity opposite the first polarity; and
the total feedback signal comprises a sum of the first feedback signal and the second feedback signal, the second feedback signal offsetting the second component of the first feedback signal responsive to the primary magnetizing current such that the total feedback signal represents only the load current.

14. The system as defined in claim 10, wherein the first current sensor comprises a first diode and a primary sensing resistor, the first diode enabling the primary current to flow through the primary winding in first direction and through the primary sensing resistor during a first half of each cycle of the primary AC voltage, the primary sensing resistor producing a voltage responsive to the current flowing through the primary winding during the first half of each AC cycle of the primary AC voltage.

15. The system as defined in claim 14, further comprising a second diode, the second diode enabling the primary current to flow through the primary winding in a second direction during a second half of each AC cycle of the primary AC voltage, the primary current bypassing the primary sensing resistor when flowing in the second direction.

16. The method as defined in claim 10, wherein the inductance of the auxiliary inductor is selected to be substantially equal to the magnetizing inductance of the primary winding.

17. The method as defined in claim 1, wherein the inductance of the auxiliary inductor is selected to be substantially equal to the magnetizing inductance of the primary winding.

\* \* \* \* \*